(12) United States Patent
Nakao et al.

(10) Patent No.: US 12,136,833 B2
(45) Date of Patent: Nov. 5, 2024

(54) CONTACTLESS POWER FEEDING APPARATUS

(71) Applicant: OMRON Corporation, Kyoto (JP)

(72) Inventors: Goro Nakao, Kyoto (JP); Hiroaki Ota, Kyoto (JP); Ken Onozaka, Kyoto (JP); Yuki Ito, Kyoto (JP); Taichi Mishima, Kyoto (JP); Yusuke Kawai, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/057,237

(22) Filed: Nov. 21, 2022

(65) Prior Publication Data

US 2023/0187982 A1 Jun. 15, 2023

(30) Foreign Application Priority Data

Dec. 14, 2021 (JP) .................................. 2021-202804

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC ............. H02J 50/00; H02J 50/12; H02J 50/80
See application file for complete search history.

(56) References Cited

U.S. PATENT DOCUMENTS

| 2016/0197494 A1* | 7/2016 | Kwon | H04B 5/79 307/104 |
|---|---|---|---|
| 2019/0305600 A1* | 10/2019 | Nakao | H02J 50/12 |
| 2020/0203823 A1* | 6/2020 | Shoji | H01P 5/02 |

FOREIGN PATENT DOCUMENTS

JP 2019-176565 A 10/2019

* cited by examiner

*Primary Examiner* — Rexford N Barnie
*Assistant Examiner* — Joseph N Inge
(74) *Attorney, Agent, or Firm* — METROLEX IP LAW GROUP, PLLC; Robert L. Scott, Esq.

(57) ABSTRACT

A power transmitting apparatus included in a contactless power feeding apparatus includes a power supply circuit that supplies AC power having a predetermined drive frequency to a transmission coil for supplying power to a power receiving apparatus, a power receiving circuit that receives returning power transmitted from the power receiving apparatus, a control circuit that controls, according to a voltage of the returning power, the power supply circuit such that an output voltage of the power receiving apparatus is in a predetermined allowable range. Also, the power receiving apparatus includes a resonant circuit for receiving power via the transmission coil of the power transmitting apparatus, a rectifier circuit that rectifies power received via the resonant circuit, and a power transmitting circuit that transmits the returning power according to a voltage of power output from the rectifier circuit to the power transmitting apparatus.

3 Claims, 5 Drawing Sheets

CONTACTLESS POWER FEEDING APPARATUS

CROSS-REFERENCES TO RELATED APPLICATIONS

This application claims priority to Japanese Patent Application No. 2021-202804 filed Dec. 14, 2021, the entire contents of which are incorporated herein by reference.

FIELD

The present disclosure relates to a contactless power feeding apparatus.

BACKGROUND

Heretofore, techniques for so-called contactless power feeding (also referred to as "wireless power feeding") in which power is transmitted through a space without using metal contacts and so on have been studied.

As one such contactless power feeding technique, a technique has been proposed for transmitting power from a power transmitting side apparatus (hereinafter, simply referred to as a "power transmitting apparatus") to a power receiving side apparatus (hereinafter, simply referred to as a "power receiving apparatus") through a power transmitting side coil and a power receiving side coil, and suppressing the voltage of power output from the power receiving side apparatus from excessively increasing (see JP 2019-176565A). In a contactless power feeding apparatus disclosed in JP 2019-176565A, if the measured value of an output voltage obtained by rectifying power received from a power transmitting apparatus through a resonant circuit of a power receiving apparatus has increased to an upper limit threshold value or more, the power receiving apparatus notifies the power transmitting apparatus of the fact that the output voltage is anomalous via communicators respectively provided in the power receiving apparatus and the power transmitting apparatus.

JP 2019-176565A is an example of the related art.

In the technique described above, communicators respectively provided in a power receiving apparatus and a power transmitting apparatus are used for the power receiving apparatus to notify the power transmitting apparatus of the fact that the output voltage is anomalous. Therefore, the circuit configurations of the power transmitting apparatus and the power receiving apparatus is made more complex. Also, if it is difficult to establish communication between the communicator of the power transmitting apparatus and the communicator of the power receiving apparatus, the power receiving apparatus may not notify the power transmitting apparatus of the fact that the output voltage is anomalous.

Therefore, one or more embodiments aims to provide a contactless power feeding apparatus in which a power receiving apparatus may notify a power transmitting apparatus of information regarding an output voltage of the power receiving apparatus without using a communicator.

SUMMARY

A contactless power feeding apparatus according to one or more embodiments may include a power transmitting apparatus and a power receiving apparatus to which power is contactlessly transmitted from the power transmitting apparatus. In the contactless power feeding apparatus, the power transmitting apparatus includes a transmission coil for supplying power to the power receiving apparatus; a power supply circuit configured to supply AC power having a predetermined drive frequency to the transmission coil; a power receiving circuit configured to receive returning power transmitted from the power receiving apparatus; and a control circuit configured to control the power supply circuit to supply AC power having the drive frequency to the transmission coil, and perform control, according to a voltage of the returning power, such that an output voltage of the power receiving apparatus is in a predetermined allowable range. Also, the power receiving apparatus includes a resonant circuit including a receiver coil for receiving power via the transmission coil of the power transmitting apparatus, and a resonance capacitor that resonates together with the receiver coil, a rectifier circuit configured to rectify power received via the resonant circuit, and a power transmitting circuit configured to transmit the returning power according to a voltage of power output from the rectifier circuit to the power transmitting apparatus. By employing such a configuration, the contactless power feeding apparatus may notify the power transmitting apparatus of information regarding an output voltage of the power receiving apparatus from the power receiving apparatus without using a communicator.

In the power receiving apparatus of the contactless power feeding apparatus, it may be preferable that the power transmitting circuit changes the frequency of the returning power from the drive frequency. By employing such a configuration, because direct receipt of power by the power receiving circuit from the transmission coil is suppressed, the contactless power feeding apparatus may accurately detect an output voltage of the power receiving apparatus.

Accordingly, it may be preferable that the power receiving circuit of the power transmitting apparatus includes a filter circuit for removing a frequency component corresponding to the drive frequency from the received returning power. By employing such a configuration, the contactless power feeding apparatus may more accurately detect an output voltage of the power receiving apparatus.

Furthermore, it may be preferable that, in the contactless power feeding apparatus, the power receiving circuit of the power transmitting apparatus includes a counter-receiver coil for receiving the returning power, and the counter-receiver coil and the transmission coil are arranged such that a winding axis of the counter-receiver coil matches a winding axis of the counter-transmission coil, and the power transmitting circuit of the power receiving apparatus includes a counter-transmission coil for transmitting the returning power, and the counter-transmission coil and the receiver coil are arranged such that a winding axis of the counter-transmission coil matches the winding axis of the receiver coil. By employing such a configuration, the contactless power feeding apparatus may keep the relationship constant between the degree of coupling between the transmission coil and the receiver coil and the degree of coupling between the counter-transmission coil and the counter-receiver coil, and therefore may accurately detect an output voltage of the power receiving apparatus based on the voltage of the returning power.

DETAILED DESCRIPTION

Hereinafter, a contactless power feeding apparatus according to one or more embodiments will be described with reference to the drawings. In the contactless power feeding apparatus according one or more embodiments, circuits for transmitting power from a power receiving apparatus to a power transmitting apparatus are respectively provided in the power transmitting apparatus and the power receiving apparatus, separately from a coil for power transmission (hereinafter, referred to as a "transmission coil") provided in the power transmitting apparatus and a coil for power reception (hereinafter, referred to as a "receiver coil") provided in the power receiving apparatus, these coils being provided for transmitting power from the power transmitting apparatus to the power receiving apparatus. Then, the power receiving apparatus transmits power to the power transmitting apparatus by supplying AC power in which the voltage changes according to the power received from the power transmitting apparatus and the frequency is different from the frequency of AC power supplied to the transmission coil, to a coil included in a circuit for transmitting power. Therefore, the power transmitting apparatus can detect the output voltage of the power receiving apparatus by detecting the voltage of power received from the power receiving apparatus without using communicators. In the following, the frequency of AC power supplied to the transmission coil may be simply referred to as a "drive frequency".

Figure 1:
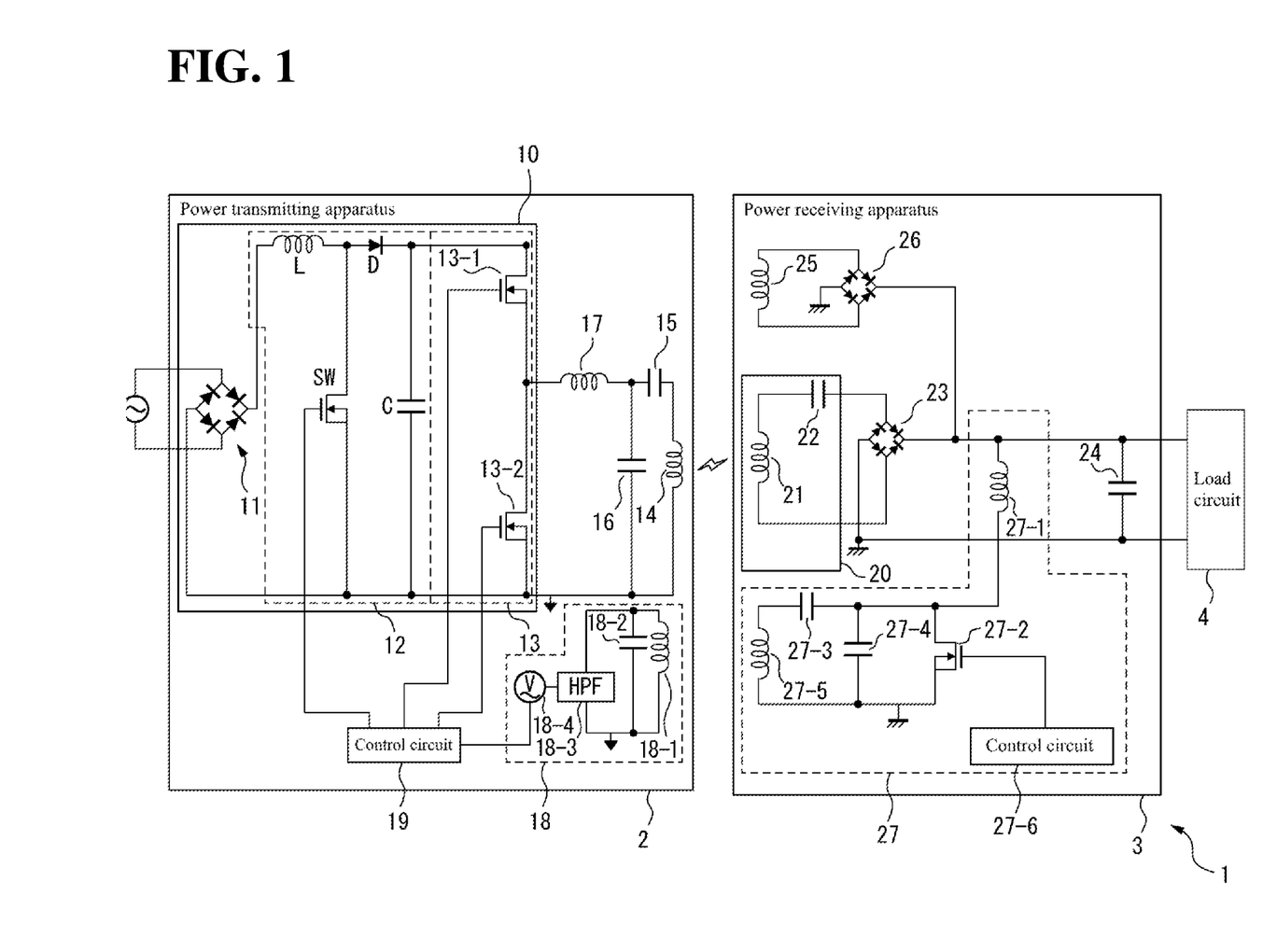
FIG. 1 is a schematic configuration diagram illustrating a contactless power feeding apparatus according to one or more embodiments.

FIG. 1 is a schematic configuration diagram of the contactless power feeding apparatus according to one or more embodiments. As shown in FIG. 1, a contactless power feeding apparatus 1 includes a power transmitting apparatus 2 and a power receiving apparatus 3 to which power is contactlessly transmitted through a space from the power transmitting apparatus 2. The power transmitting apparatus 2 includes a power supply circuit 10, a transmission coil 14, a first capacitor 15, a second capacitor 16, a first coil 17, a power receiving circuit 18, and a control circuit 19. On the other hand, the power receiving apparatus 3 includes a resonant circuit 20 including a receiver coil 21 and a resonance capacitor 22, a first rectifier circuit 23, a smoothing capacitor 24, a subcoil 25, a second rectifier circuit 26, and a power transmitting circuit 27. Also, the power receiving apparatus 3 is connected to a load circuit 4, and the power received and converted by the power receiving apparatus 3 to DC power is output to the load circuit 4.

The contactless power feeding apparatus 1 according to the present embodiment can maintain a so-called constant voltage output operation in which the voltage output from the power receiving apparatus 3 (hereinafter, may also simply referred to as an "output voltage") can be substantially kept constant, even if the resistance value of the load circuit 4 connected to the power receiving apparatus 3 changes. However, the output voltage of the power receiving apparatus 3 changes according to the voltage of AC power supplied to the transmission coil 14 or the degree of coupling between the transmission coil 14 and the receiver coil 21. Therefore, the power receiving apparatus 3 transmits, in an opposite way, power to the power transmitting apparatus 2 via the power transmitting circuit 27 using AC power having a voltage according to the output voltage. The power transmitting apparatus 2 detects the output voltage of the power receiving apparatus 3 by detecting the voltage of power received from the power transmitting circuit 27 via the power receiving circuit 18, and controls the power supply circuit 10 to adjust the voltage of AC power supplied from the power supply circuit 10 to the transmission coil 14 based on the detection result.

First, the power transmitting apparatus 2 will be described. The power supply circuit 10 supplies AC power having a predetermined drive frequency and an adjustable voltage to the transmission coil 14. Accordingly, the power supply circuit 10 includes a full-wave rectifier circuit 11, a power factor improvement circuit 12, and an inverter 13.

The full-wave rectifier circuit 11 supplies power having a predetermined pulsating voltage. Accordingly, the full-wave rectifier circuit 11 includes four diodes that are connected in a bridge connection, and is connected to a commercial AC power supply. Also, the full-wave rectifier circuit 11 rectifies the AC power supplied from the AC power supply so as to convert the AC power to power having a pulsating voltage, and outputs the resultant power to the power factor improvement circuit 12.

The power factor improvement circuit 12 converts the voltage of power output from the full-wave rectifier circuit 11 to DC power having a voltage in accordance with the control performed by the control circuit 19, and outputs the resultant DC power. Therefore, a DC power supply is constituted by the AC power supply, the full-wave rectifier circuit 11, and the power factor improvement circuit 12.

The power factor improvement circuit 12 can be configured similarly to any of various power factor improvement circuits in which the amplification factor of an output voltage relative to an input voltage can be adjusted in accordance with the control performed by the control circuit 19. In the present embodiment, the power factor improvement circuit 12 includes a coil that is connected, at one end, in series to a positive electrode terminal of the full-wave rectifier circuit 11, and a diode that is connected between the other end of the coil and the inverter 13 such that the direction from the coil to the inverter 13 is a forward direction. The power factor improvement circuit 12 further includes a switching element in which one end thereof is connected to a node between the coil and the diode, and the other end is connected to a negative electrode terminal of the full-wave rectifier circuit 11. As a result of the control circuit 19 controlling the on/off duty ratio of the switching element, the voltage output from the power factor improvement circuit 12 is controlled.

The inverter 13 converts the DC power output from the power factor improvement circuit 12 to AC power having a drive frequency corresponding to the on/off switching cycle of switching elements 13-1 and 13-2. Then, the inverter 13 outputs the resultant AC power to the transmission coil 14 via the first capacitor 15, the second capacitor 16, and the first coil 17.

Accordingly, the inverter 13 includes the two switching elements 13-1 and 13-2. The two switching elements 13-1 and 13-2 can each be an n-channel MOS FET, for example. The inverter 13 is configured as a so-called half bridge circuit. That is, the switching element 13-1 and the switching element 13-2 are connected in series between the positive electrode terminal and negative electrode terminal of the full-wave rectifier circuit 11 via the power factor improvement circuit 12. Also, in the present embodiment, the switching element 13-1 is connected on the positive electrode side of the full-wave rectifier circuit 11, and the switching element 13-2 is connected on the negative electrode side of the full-wave rectifier circuit 11. Also, the drain terminal of the switching element 13-1 is connected to the positive electrode terminal of the full-wave rectifier circuit 11 via the power factor improvement circuit 12, and the source terminal of the switching element 13-1 is connected to the drain terminal of the switching element 13-2. Also, the source terminal of the switching element 13-2 is connected to the negative electrode terminal of the full-wave rectifier circuit 11 via the power factor improvement circuit 12. Moreover, the source terminal of the switching element 13-1 and the drain terminal of the switching element 13-2 are connected to one end of the transmission coil 14 via the first coil 17 and the first capacitor 15, and the source terminal of the switching element 13-2 is connected to the other end of the transmission coil 14.

Also, the gate terminals of the switching elements 13-1 and 13-2 are connected to the control circuit 19. Moreover, in order to ensure that a switching element is turned on when a voltage for turning on the switching element is applied to the gate terminal thereof, the gate terminals of the switching elements 13-1 and 13-2 may be respectively connected to the own source terminals via resistors. Also, the 13-1 and 13-2 are alternately switched on and off according to control signals from the control circuit 19. In the present embodiment, the 13-1 and 13-2 are alternately switched on and off such that when the switching element 13-1 is on, the switching element 13-2 is off, and conversely, when the switching element 13-2 is on, the switching element 13-1 is off. Accordingly, DC power supplied from the power factor improvement circuit 12 is converted to AC power having a drive frequency corresponding to the on/off switching cycle of the switching elements, and the resultant AC power is supplied to the transmission coil 14.

Note that the inverter 13 is not limited to the configuration described in the above embodiment. For example, the inverter 13 may also be configured as a full bridge circuit in which four switching elements are connected in a full-bridge connection.

The first coil 17 is connected in series between the inverter 13 and the transmission coil 14 along with the first capacitor 15. That is, one end of the first coil 17 is connected to one of the two output terminals of the inverter 13, that is, a node between the source terminal of the switching element 13-1 and the drain terminal of the switching element 13-2, and the other end of the first coil 17 is connected to one end of the first capacitor 15. Also, the other end of the first capacitor 15 is connected to one end of the transmission coil 14. Note that it may be preferable that the first coil 17 is disposed so as to not electromagnetically couple with the transmission coil 14 and coils included in the power receiving apparatus 3.

Moreover, one end of the second capacitor 16 is connected to a node between the other end of the first coil 17 and the one end of the first capacitor 15, and the other end of the second capacitor 16 is connected to the other end of the transmission coil 14 and the other output terminal of the inverter 13, that is the source terminal of the switching element 13-2.

As a result of the first capacitor 15, the second capacitor 16, and the first coil 17 being provided as described above, a delay in the phase of the current flowing through the transmission coil 14 relative to the phase of the voltage supplied to the transmission coil 14 is adjusted such that the switching loss of the switching elements of the inverter 13 is reduced. Moreover, the contactless power feeding apparatus 1 can perform a constant voltage output operation. Note that the settings of the electrostatic capacitances of the first capacitor 15 and the second capacitor 16 and the inductance of the first coil 17 will be described in detail later.

The transmission coil 14 transmits AC power supplied from the inverter 13 of the power supply circuit 10 via the first coil 17 and the first capacitor 15 to the resonant circuit 20 of the power receiving apparatus 3 through a space.

The power receiving circuit 18 receives power transmitted from the power transmitting circuit 27 of the power receiving apparatus 3, and outputs voltage information indicating the voltage of the received power to the control circuit 19. In the following, in order to distinguish from the power to be transmitted from the power transmitting apparatus 2 to the power receiving apparatus 3, the power to be transmitted from the power transmitting circuit 27 to the power receiving circuit 18 may be referred to as "returning power". The power receiving circuit 18 is configured as a power receiving unit of a contactless power feeding apparatus having a so-called SP topology in which a coil and a resonance capacitor resonate in series on a power transmitting side, and a coil and a resonance capacitor resonate in parallel on a power receiving side. Accordingly, the power receiving circuit 18 includes a counter-receiver coil 18-1 for power reception and a resonance capacitor 18-2 that is connected in parallel to the counter-receiver coil 18-1 and forms a resonant circuit together with the counter-receiver coil 18-1. The power receiving circuit 18 further includes a highpass filter 18-3 that is connected to the resonant circuit constituted by the counter-receiver coil 18-1 and the resonance capacitor 18-2, and a voltage detection circuit 18-4 connected to the highpass filter 18-3.

The resonant circuit constituted by the counter-receiver coil 18-1 and the resonance capacitor 18-2 receives returning power transmitted from the power transmitting circuit 27 by resonating in a magnetic field generated by the power transmitting circuit 27 of the power receiving apparatus 3. Also, the resonant circuit outputs the received power including the returning power to the highpass filter 18-3.

The highpass filter 18-3 is an example of a filter circuit and removes, from the power input from the resonant circuit constituted by the counter-receiver coil 18-1 and the resonance capacitor 18-2, a frequency component that corresponds to the power transmitted from the transmission coil 14 to the receiver coil 21. Accordingly, the highpass filter 18-3 can extract, from the input power, only the returning power transmitted from the power transmitting circuit 27 to the power receiving circuit 18, and output the returning power to the voltage detection circuit 18-4. The highpass filter 18-3 need only be a filter circuit that can pass a frequency component corresponding to the returning power, out of the input power, and remove a frequency component at a cut-off frequency lower than the aforementioned frequency component or lower.

The voltage detection circuit 18-4 detects the voltage of returning power output from the highpass filter 18-3, and outputs voltage information indicating the detected voltage of the returning power to the control circuit 19. Note that the voltage detection circuit 18-4 may be configured according to any of various circuits that can measure the voltage of AC power at a frequency of the returning power.

The control circuit 19 includes a nonvolatile memory circuit and a volatile memory circuit, a computation circuit, an interface circuit for connection to other circuits, and a driving circuit for outputting control signals to the switching elements, for example. Also, the control circuit 19 controls, every time voltage information is received from the power receiving circuit 18, the voltage of AC power supplied from the power supply circuit 10 to the transmission coil 14 according to the voltage information.

The control circuit 19 controls the power factor improvement circuit 12 such that the output voltage of the power receiving apparatus 3 is included in a preset output voltage allowable range. For example, the control circuit 19 compares the voltage of returning power received from the power receiving apparatus 3, which is indicated by the voltage information, with a reference voltage range corresponding to the output voltage allowable range. The reference voltage range is stored in a memory circuit included in the control circuit 19 in advance. If the voltage of the returning power is higher than an upper limit of the reference voltage range, it is estimated that the output voltage of the power receiving apparatus 3 is higher than the allowable range. Therefore, the control circuit 19 decreases the voltage of AC power to be supplied to the transmission coil 14 by decreasing the duty ratio of the switching element of the power factor improvement circuit 12. As a result, the voltage of power received by the receiver coil 21 of the power receiving apparatus 3 decreases, and therefore the output voltage of the power receiving apparatus 3 decreases. Conversely, if the voltage of power received from the power receiving apparatus 3, which is indicated by the voltage information, is lower than a lower limit of the reference voltage range, it is estimated that the output voltage of the power receiving apparatus 3 is lower than the allowable range. Therefore, the control circuit 19 increases the voltage of AC power to be supplied to the transmission coil 14 by increasing the duty ratio of the switching element of the power factor improvement circuit 12. As a result, the voltage of power received by the receiver coil 21 of the power receiving apparatus 3 increases, and therefore the output voltage of the power receiving apparatus 3 increases. Also, if the voltage of power received from the power receiving apparatus 3, which is indicated by the voltage information, is included in the reference voltage range, it is estimated that the output voltage of the power receiving apparatus 3 falls within the allowable range. Therefore, the control circuit 19 keeps the duty ratio of the switching element of the power factor improvement circuit 12 constant without change.

Moreover, the control circuit 19 turns the 13-1 and 13-2 of the inverter 13 on and off such that the frequency of AC power to be supplied from the inverter 13 to the transmission coil 14 is a predetermined drive frequency. That is, the control circuit 19 controls the switching elements 13-1 and 13-2 such that the switching element 13-1 and the switching element 13-2 are alternately turned on, and the period in which the switching element 13-1 is on, in one cycle time corresponding to the predetermined drive frequency, is equal to the period in which the switching element 13-2 is on. Note that the control circuit 19 may also provide a dead time in which both of the switching elements are off when switching on/off of the switching element 13-1 and the switching element 13-2 in order to prevent the AC power supply from being short-circuited due to the switching element 13-1 and the switching element 13-2 being on at the same time.

Next, the power receiving apparatus 3 will be described. The resonant circuit 20 is an LC resonant circuit in which the receiver coil 21 and the resonance capacitor 22 are connected in series. Also, one end of the receiver coil 21 included in the resonant circuit 20 is connected to one input terminal of the first rectifier circuit 23 via the resonance capacitor 22. Also, the other end of the receiver coil 21 is connected to the other input terminal of the first rectifier circuit 23.

The receiver coil 21 receives power from the transmission coil 14 by resonating, together with the resonance capacitor 22, with an AC current flowing through the transmission coil 14 of the power transmitting apparatus 2. Also, the receiver coil 21 outputs the received power to the first rectifier circuit 23 via the resonance capacitor 22. Note that the number of turns of the receiver coil 21 may be the same as or different from the number of turns of the transmission coil 14 of the power transmitting apparatus 2.

The resonance capacitor 22 is connected in series to the receiver coil 21. That is, one end of the resonance capacitor 22 is connected to one end of the receiver coil 21, and the other end thereof is connected to the first rectifier circuit 23. Also, the resonance capacitor 22 outputs the received power to the first rectifier circuit 23 by resonating together with the receiver coil 21.

The first rectifier circuit 23 is an example of a rectifier circuit, and can be configured as a full-wave rectifier circuit including four diodes that are in a bridge connection, for example. One of two terminals on an input side of the first rectifier circuit 23 is connected to the resonance capacitor 22, and the other of the two terminals on the input side is connected to the receiver coil 21. Also, one of two terminals on an output side of the first rectifier circuit 23 is connected to one end of the smoothing capacitor 24, and the other of the two terminals on the output side is connected to the other end of the smoothing capacitor 24, and is also grounded. Also, the first rectifier circuit 23 converts AC power output from the resonant circuit 20 to DC power by rectifying the AC power together with the smoothing capacitor 24.

The smoothing capacitor 24 converts, together with the first rectifier circuit 23 or the second rectifier circuit 26, AC power received via the resonant circuit 20 or the subcoil 25 to DC power. Also, the smoothing capacitor 24 outputs the resultant DC power to the load circuit 4. Accordingly, one end of the smoothing capacitor 24 is connected to one of two terminals on the output side of the first rectifier circuit 23, one of two terminals on an output side of the second rectifier circuit 26, and one end of the load circuit 4. Also, the other end of the smoothing capacitor 24 is connected to the other of the two terminals on the output side of the first rectifier circuit 23, the other of the two terminals on the output side of the second rectifier circuit 26, and the other end of the load circuit 4.

The subcoil 25 is provided so as to be able to electromagnetically couple with the receiver coil 21 of the resonant circuit 20. For example, the subcoil 25 and the receiver coil 21 are wound around the same core. Also, the two ends of the subcoil 25 are respectively connected to two input terminals of the second rectifier circuit 26. As a result of providing such a subcoil 25, the voltage applied to the resonant circuit 20 is suppressed from excessively increasing. For example, when the load of the load circuit 4 increases, if the contactless power feeding apparatus 1 tries to maintain a constant voltage output operation, and the voltage applied to the receiver coil 21 increases, the voltage applied to the subcoil 25 also increases following the increase in the voltage applied to the receiver coil 21. Then, if the voltage applied by the subcoil 25 exceeds the output voltage of the power receiving apparatus 3, some of the transmitted power flows from the subcoil 25 to the smoothing capacitor 24 via the second rectifier circuit 26, and therefore an excessive voltage is suppressed from being applied to the resonant circuit 20. On the other hand, when the voltage output from the resonant circuit 20 to the load circuit 4 via the first rectifier circuit 23 and the smoothing capacitor 24 is of a certain magnitude, the voltage between two terminals of the smoothing capacitor 24 also becomes larger than the voltage between two output terminals of the second rectifier circuit 26 due to the voltage between the two terminals of the subcoil 25. Therefore, a current will not flow from the subcoil 25 to the smoothing capacitor 24. As a result, when the contactless power feeding apparatus 1 continues a constant voltage output operation, the subcoil 25 will not influence the constant voltage output operation.

Note that it may be preferable that the number of turns ns of the subcoil 25 is set such that the number of turns ns of the subcoil 25 is smaller than the number of turns nm of the receiver coil 21. Moreover, it may be preferable that the ratio (nm/ns) of the number of turns nm of the receiver coil 21 to the number of turns ns of the subcoil 25 is set such that the envisioned maximum value of the voltage wave height of the subcoil 25 is less than or equal to an output voltage of the smoothing capacitor 24 when the contactless power feeding apparatus 1 is executing a constant voltage output operation. The output voltage is set according to the specification of the load circuit 4.

The second rectifier circuit 26 can be configured as a full-wave rectifier circuit including four diodes that are in a bridge connection, for example. Note that the second rectifier circuit 26 may be a rectifier circuit of another type. One of the two terminals of the second rectifier circuit 26 on the input side is connected to one end of the subcoil 25, and the other of the two terminals is connected to the other end of the subcoil 25. Also, one of the two terminals of the second rectifier circuit 26 on the output side is connected to one end of the smoothing capacitor 24, and the other of the two terminals on the output side is grounded. Also, if the voltage between the two terminals of the second rectifier circuit 26 on the output side according to the voltage applied between the two terminals of the subcoil 25 is larger than the voltage between two terminals of the smoothing capacitor 24, the second rectifier circuit 26 outputs power output from the subcoil 25 to the smoothing capacitor 24.

The power transmitting circuit 27 transmits returning power having a voltage according to the output voltage of the power receiving apparatus 3 to the power receiving circuit 18 of the power transmitting apparatus 2. Accordingly, the power transmitting circuit 27 includes a coil 27-1, a switching element 27-2, two capacitors 27-3 and 27-4, a counter-transmission coil 27-5, and a control circuit 27-6.

One end of the coil 27-1 is connected to a node between the smoothing capacitor 24 and output terminals of the first rectifier circuit 23 and the second rectifier circuit 26, and the other end thereof is grounded via the switching element 27-2. One end of the capacitor 27-3 is connected to the other end of the coil 27-1, and the other end of the capacitor 27-3 is connected to one end of the counter-transmission coil 27-5. The counter-transmission coil 27-5 is connected, at one end thereof, in series to the capacitor 27-3, and the other end of the counter-transmission coil 27-5 is grounded. Also, the resonant circuit on the power transmitting side in contactless power feeding of an SP topology is constituted by the counter-transmission coil 27-5 and the capacitor 27-3.

Moreover, the capacitor 27-4 is arranged such that one end thereof is connected to a node between the other end of the coil 27-1 and the capacitor 27-3, and the other end of the capacitor 27-4 is grounded. The switching element 27-2 is a MOS FET, for example, and is disposed such that the other end of the coil 27-1 is grounded when turned on. The gate terminal of the switching element 27-2 is connected to the control circuit 27-6, and on/off of the switching element 27-2 is switched according to a control signal from the control circuit 27-6. The control circuit 27-6 periodically switches the switching element 27-2 on/off at a cycle corresponding to the resonance frequency of a resonant circuit configured by the counter-transmission coil 27-5 and the capacitor 27-3 and the resonant circuit of the power receiving circuit 18 of the power transmitting apparatus 2. As described above, the power transmitting circuit 27 is configured following a class-E amplifier structure, and therefore the power transmitting circuit 27 can supply, to the counter-transmission coil 27-5, AC power having a voltage according to the output voltage of the power receiving apparatus 3 and having a resonance frequency of the resonant circuit configured by the counter-transmission coil 27-5 and the capacitor 27-3 and the resonant circuit of the power receiving circuit 18 of the power transmitting apparatus 2. As a result, returning power having a voltage according to the output voltage of the power receiving apparatus 3 is transmitted from the power transmitting circuit 27 of the power receiving apparatus 3 to the power receiving circuit 18 of the power transmitting apparatus 2.

It may be preferable that the resonance frequency of the resonant circuit constituted by the counter-transmission coil 27-5 and the capacitor 27-3 and the resonant circuit of the power receiving circuit 18 of the power transmitting apparatus 2 is set to a frequency different from the drive frequency. In the present embodiment, the resonance frequency of the resonant circuit constituted by the counter-transmission coil 27-5 and the capacitor 27-3 and the resonant circuit of the power receiving circuit 18 of the power transmitting apparatus 2 is set to a frequency that is higher than the drive frequency, and is more preferably set to a frequency that is more than ten to a hundred times the drive frequency. Accordingly, as a result of the counter-receiver coil 18-1 of the power receiving circuit 18 directly receiving power transmitted from the transmission coil 14 to the receiver coil 21, it may be possible to suppress inaccurate reflection of the output voltage of the power receiving apparatus 3 on the voltage indicated by voltage information output from the power receiving circuit 18.

Moreover, it may be preferable that the transmission coil 14 and the counter-receiver coil 18-1 and the receiver coil 21 and the counter-transmission coil 27-5 are arranged such that the degree of coupling between the transmission coil 14 and the receiver coil 21 and the degree of coupling between the counter-transmission coil 27-5 and the counter-receiver coil 18-1 are in a one-to-one correspondence. Accordingly, it may be preferable that the transmission coil 14 and the counter-receiver coil 18-1 are concentrically arranged such that the winding axes thereof substantially match. For example, the transmission coil 14 and the counter-receiver coil 18-1 are wound around the same core. Similarly, it may be preferable that the receiver coil 21 and the counter-transmission coil 27-5 are concentrically arranged such that the es thereof substantially match. For example, the receiver coil 21 and the counter-transmission coil 27-5 are wound around the same core. Furthermore, it may be preferable that, when the power receiving apparatus 3 receives power from the power transmitting apparatus 2, the winding axes of the transmission coil 14 and the counter-receiver coil 18-1 are substantially in parallel with the winding axes of the receiver coil 21 and the counter-transmission coil 27-5. Accordingly, it may be preferable that the transmission coil 14 and the counter-receiver coil 18-1 are arranged such that the winding axes of the transmission coil 14 and the counter-receiver coil 18-1 are orthogonal to an outer wall, of a casing (not shown) housing the power transmitting apparatus 2, that faces the power receiving apparatus 3. Similarly, it may be preferable that the receiver coil 21 and the counter-transmission coil 27-5 are arranged such that the winding axes of the receiver coil 21 and the counter-transmission coil 27-5 are orthogonal to an outer wall, of a casing (not shown) housing the power receiving apparatus 3, that faces the power transmitting apparatus 2. As a result of these coils being arranged as described above, the relationship between the output voltage of the power receiving apparatus 3 and the voltage of returning power received by the power receiving circuit 18 of the power transmitting apparatus 2 from the power transmitting circuit 27 of the power receiving apparatus 3 is always kept constant, and therefore the control circuit 19 of the power transmitting apparatus 2 can accurately detect the output voltage of the power receiving apparatus 3.

Figure 2:
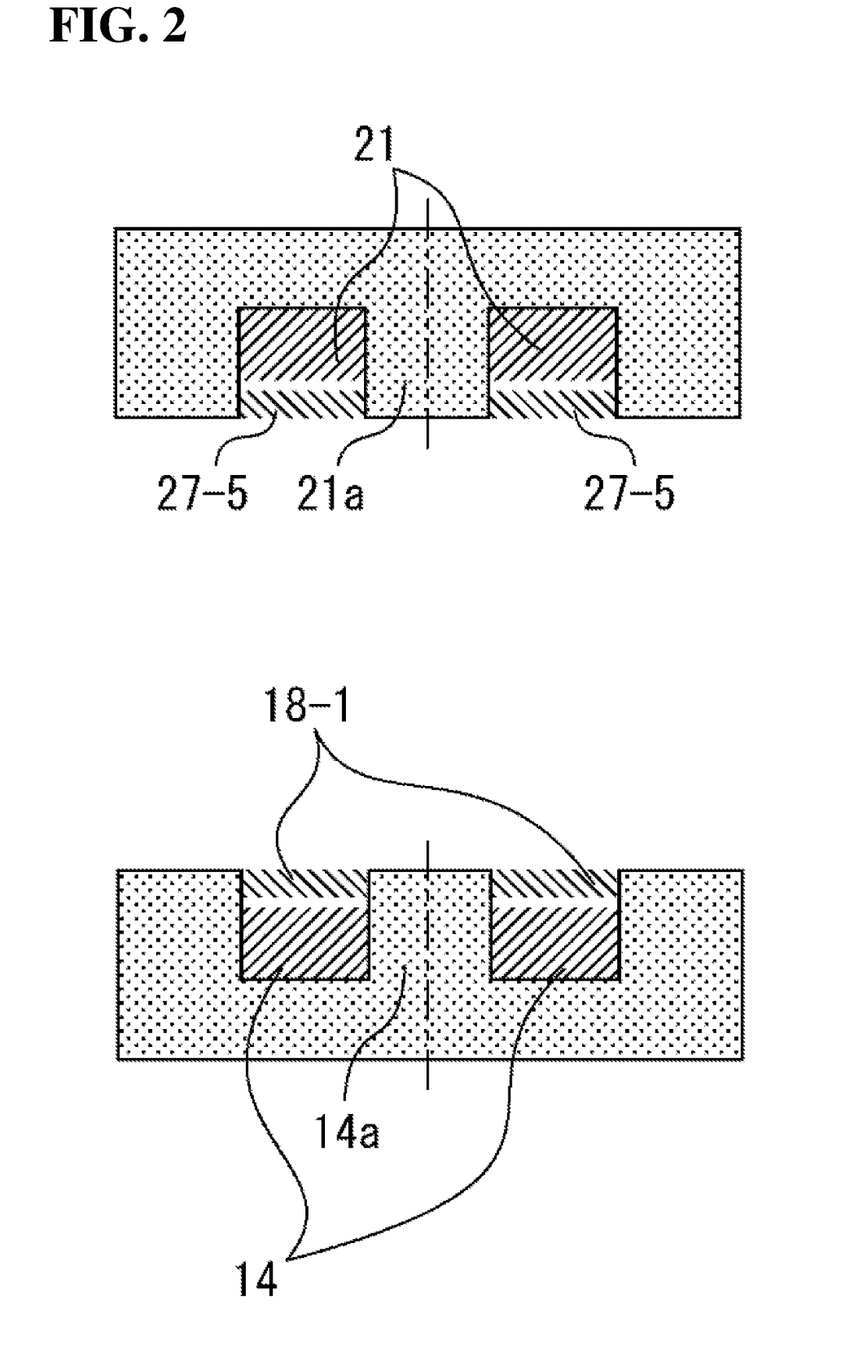
FIG. 2 is a diagram illustrating a cross-sectional view of an example of an arrangement of a transmission coil and a counter-receiver coil and an arrangement of a receiver coil and a counter-transmission coil.

FIG. 2 is a cross-sectional view illustrating an example of the arrangement of the transmission coil 14 and the counter-receiver coil 18-1 and the arrangement of the receiver coil 21 and the counter-transmission coil 27-5. As shown in FIG. 2, the transmission coil 14 and the counter-receiver coil 18-1 are wound around a same core 14a. Note that the transmission coil 14 and the counter-receiver coil 18-1 are separated from each other so as to be insulated from each other. Also, the receiver coil 21 and the counter-transmission coil 27-5 are wound around a same core 21a. Also, the receiver coil 21 and the counter-transmission coil 27-5 are separated from each other so as to be insulated from each other. Note that the subcoil 25 may also be wound around the core 21a.

According to a modification, the transmission coil 14 and the counter-receiver coil 18-1 may also be respectively attached to a front face and a rear face of the same substrate such that the winding axes thereof match. Similarly, the receiver coil 21 and the counter-transmission coil 27-5 may also be respectively attached to a front face and a rear face of the same substrate such that the winding axes thereof match.

In the following, operations of the contactless power feeding apparatus 1 will be described in detail.

In the present embodiment, the control circuit 19 of the power transmitting apparatus 2 controls the voltage of AC power to be supplied from the power supply circuit 10 to the transmission coil 14 based on voltage information received from the power receiving circuit 18 such that the contactless power feeding apparatus 1 continues a constant voltage output operation, and the output voltage of the power receiving apparatus 3 is included in an allowable range. In the following, the output voltage of the power receiving apparatus 3 may simply be referred to as an "output voltage".

It may be preferable that, in order for the contactless power feeding apparatus 1 to perform a constant voltage output operation, in the vicinity of the drive frequency of AC power supplied from the power supply circuit 10 to the transmission coil 14, a change in the output voltage relative to a change in the drive frequency is small. If the change in the output voltage relative to the change in the drive frequency is large, the power transmission efficiency changes when there is a slight change in the positional relationship between the transmission coil 14 and receiver coil 21, or when there is a slight change in the circuit constants of the elements of the power transmitting apparatus 2 or the power receiving apparatus 3. Moreover, it may be preferable that a maximum value is present in frequency characteristics of the output voltage at the drive frequency or a frequency in the vicinity thereof, in order to improve the power transmission efficiency.

Figure 3:
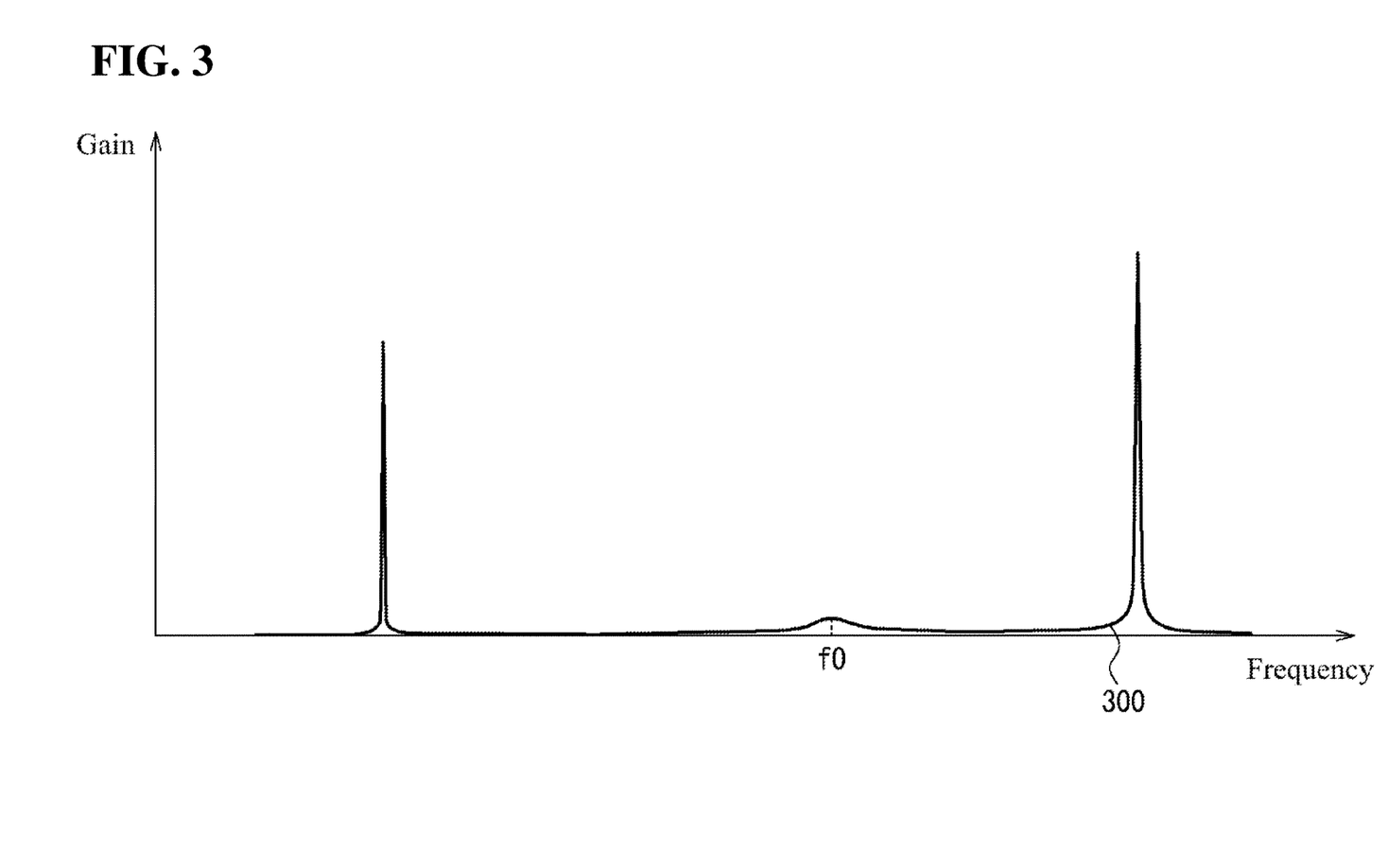
FIG. 3 is a schematic diagram illustrating an example of frequency characteristics of a gain regarding power to be transmitted, in a contactless power feeding apparatus.

FIG. 3 is a schematic diagram illustrating an example of the frequency characteristics of a gain regarding power to be transmitted, in the contactless power feeding apparatus 1. In FIG. 3, the horizontal axis shows the frequency, and the vertical axis shows the gain. Also, a graph 300 shows an example of the frequency characteristics of the gain. In the frequency characteristics 300, the gain attains maximum values at three frequencies different to each other. The change in gain relative to the change in frequency is moderate in the vicinity of a frequency f0, out of the frequencies at which the gain attains maximum values, relative to the vicinities of the other frequencies at which the gain attains maximum values. Therefore, it may be preferable that the inverter 13 of the power supply circuit 10 is controlled such that the drive frequency is at the frequency f0 or a frequency in the vicinity thereof. The frequency f0 is a resonance frequency of the resonant circuit 20 of the power receiving apparatus 3. The reason why the frequency f0 is a resonance frequency of the resonant circuit 20 will be described below.

Figure 4:
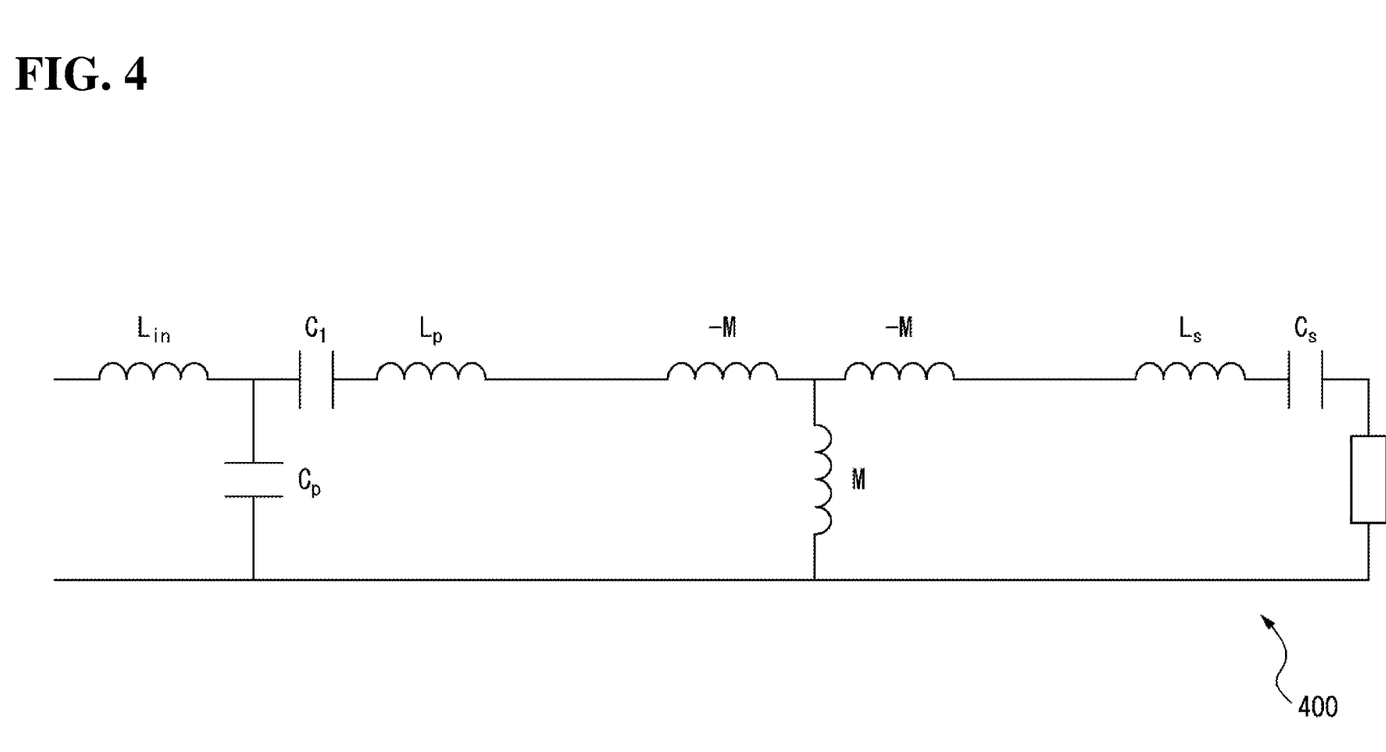
FIG. 4 is a diagram illustrating an equivalent circuit of a transmission coil, a first capacitor, a second capacitor, and a first coil of a power transmitting apparatus and a resonant circuit of a power receiving apparatus.

FIG. 4 is an equivalent circuit diagram of the transmission coil 14, the first capacitor 15, the second capacitor 16, and the first coil 17 of the power transmitting apparatus 2, and the resonant circuit 20 of the power receiving apparatus 3. In an equivalent circuit 400, a parameter $L_{in}$ represents an inductance of the first coil 17. Also, parameters $C_1$ and $C_p$ respectively represent an electrostatic capacitance of the first capacitor 15 and an electrostatic capacitance of the second capacitor 16. Moreover, a parameter $L_p$ and a parameter $L_s$ respectively represent an inductance of the transmission coil 14 and an inductance of the receiver coil 21, and a parameter $C_s$ represents an electrostatic capacitance of the resonance capacitor 22. Furthermore, a parameter M is a mutual inductance between the transmission coil 14 and the receiver coil 21. Note that, when the degree of coupling between the transmission coil 14 and the receiver coil 21 is denoted as k, $M=k(L_p L_s)^{1/2}$.

The F-matrix of the equivalent circuit 400 is represented by the following equation.

[Equation 1]

$$\begin{pmatrix} V_1 \\ I_1 \end{pmatrix} = F \begin{pmatrix} V_2 \\ I_2 \end{pmatrix} = \begin{pmatrix} A & B \\ C & D \end{pmatrix} \begin{pmatrix} V_2 \\ I_2 \end{pmatrix} \quad (1)$$

$$F(\omega, L_{in}, C_p, C_1, L_p, L_s, k, C_s) :=$$

$$\begin{bmatrix} 1 & 1i \cdot \omega \cdot L_{in} \\ 0 & 1 \end{bmatrix} \begin{bmatrix} 1 & 0 \\ 1i \cdot \omega \cdot C_p & 1 \end{bmatrix} \cdot \begin{bmatrix} 1 & \dfrac{1}{1i \cdot \omega \cdot C_1} \\ 0 & 1 \end{bmatrix} \cdot$$

$$\begin{bmatrix} \dfrac{1}{k} \cdot \sqrt{\dfrac{L_p}{L_s}} & \dfrac{1i \cdot \omega \cdot (1-k^2) \cdot \sqrt{L_p \cdot L_s}}{k} \\ \dfrac{1}{1i \cdot \omega \cdot k \cdot \sqrt{L_p \cdot L_s}} & \dfrac{1}{k} \cdot \sqrt{\dfrac{L_s}{L_p}} \end{bmatrix} \cdot \begin{bmatrix} 1 & \dfrac{1}{1i \cdot \omega \cdot C_s} \\ 0 & 1 \end{bmatrix}$$

Note that a parameter ω is an angular frequency corresponding to the drive frequency f, and ω=2πf.

Therefore, a terminal constant A is represented by the following equation. Note that the terminal constant A represents a transfer characteristic of a ratio (V1/V2) of the voltage V1 (in the following, referred to as an "input voltage V1", for convenience) of AC power applied to the transmission coil 14 via the first capacitor 15, the second capacitor 16, and the first coil 17, relative to an output voltage V2 of the resonant circuit 20, when an output current I2 of the resonant circuit 20 is zero.

[Equation 2]

$$A = \frac{-2 \cdot C_1 \cdot C_p \cdot L_{in} \cdot L_p \cdot \omega^4 + (2 \cdot C_1 \cdot L_p + (C_p + C_1) \cdot L_{in}) \cdot \omega^2 - 1}{C_1 \cdot \omega^2 \cdot k \cdot \sqrt{L_p \cdot L_s}} \quad (2)$$

Moreover, a terminal constant B representing a transfer characteristic of a ratio (V1/I2) of the input voltage V1 relative to the output current I2 when an output voltage V2 of the resonant circuit 20 is zero is represented by the following equation.

[Equation 3]

$$B = \frac{L_p \cdot L_s \cdot C_p \cdot L_{in} \cdot (k^2 - 1)}{k \cdot \sqrt{L_p \cdot L_s}} \cdot \omega^3 + \\ \frac{(L_p \cdot L_s \cdot C_1 \cdot (1 - k^2) + L_{in} \cdot L_s \cdot (C_p + C_1))}{C_1 \cdot k \cdot \sqrt{L_p \cdot L_s}} \cdot \omega - \\ \frac{L_s}{C_1 \cdot k \cdot \sqrt{L_p \cdot L_s}} \cdot \frac{1}{\omega} + \frac{C_1 \cdot C_p \cdot L_{in} \cdot L_p}{C_1 \cdot C_s \cdot k \cdot \sqrt{L_p \cdot L_s}} \cdot \omega - \\ \frac{C_1 \cdot L_p + (C_p + C_1) \cdot L_{in}}{C_1 \cdot C_s \cdot k \cdot \sqrt{L_p \cdot L_s}} \cdot \frac{1}{\omega} + \frac{1}{C_1 \cdot C_s \cdot k \cdot \sqrt{L_p \cdot L_s}} \cdot \frac{1}{\omega^3} \quad (3)$$

Also, a gain G of the output voltage of the resonant circuit 20 is represented by the following equation.

[Equation 4]

$$G = \frac{1}{A + \frac{B}{R}} \quad (4)$$

Here, a parameter R is an AC-equivalent resistance value of the load circuit 4.

As shown in Equation (4), the gain G is determined by the terminal constant A, the terminal constant B, and the AC-equivalent resistance value of the load circuit 4. Among these parameters, as shown in Equation (2), the terminal constant A is determined only by the circuit constants of the elements on the power transmitting apparatus 2 side, and two angular frequencies ω are present at which the terminal constant A is zero. Moreover, the two angular frequencies at which the terminal constant A is zero are angular frequencies determined by a fough-order or quadratic term of the angular frequency ω, and therefore the terminal constant A rapidly changes following the change in angular frequency in the vicinities of the two angular frequencies.

On the other hand, with respect to the terminal constant B, a third or greater order term of the angular frequency ω is present, as shown in Equation (3), and therefore at least three angular frequencies ω are present at which the terminal constant B is zero. Also, one of the angular frequencies at which the terminal constant B is zero corresponds to the frequency f0 in FIG. 3. Note that it may be preferable that the circuit constants of the coils and the capacitors of the power transmitting apparatus 2 and the circuit constants of the receiver coil 21 and the resonance capacitor 22 of the power receiving apparatus 3 are set such that the terminal constant B is larger than the terminal constant A at one angular frequency at which the terminal constant B is not zero. By setting the circuit constants of the elements as described above, the terms of the terminal constant A are dominant with respect to the gain G, in the vicinities of angular frequencies at which the terminal constant B is zero and that are sufficiently apart from angular frequencies at which the terminal constant A is zero, and the terms of the terminal constant B are dominant with respect to the gain G, at other angular frequencies at which the terminal constant B is not zero. Therefore, the value of gain at the frequency f0 in FIG. 3 is relatively larger than the gain at a frequency in the vicinity of the frequency f0.

If Equation (3) is solved with respect to the square of the angular frequency while ignoring the term of $k^2$, assuming that the terminal constant B is zero and $1 \gg k^2$ is established in Equation (3), the following solutions are obtained.

[Equation 5]

$$\omega^2 = \frac{1}{L_s C_s}, \frac{1}{2}\left(\frac{1}{L_{in}C_p} + \frac{1}{L_pC_1} + \frac{1}{L_sC_s}\right) \pm \\ \sqrt{\left(\frac{1}{L_{in}C_p} + \frac{1}{L_pC_1} + \frac{1}{L_sC_s}\right)^2 - \frac{4}{L_{in}C_pL_pC_1}} \quad (5)$$

Of these solutions, the first solution corresponds to a resonance frequency of the resonant circuit 20 of the power receiving apparatus 3. Also, the frequency corresponding to this solution corresponds to the frequency f0 in FIG. 3.

Moreover, as is apparent from Equation (4), the gain G does not depend on the resistance of the load circuit 4 at an angular frequency at which the terminal constant B is zero. Therefore, by setting the drive frequency to a frequency corresponding to an angular frequency at which the terminal constant B is zero or to a frequency in the vicinity thereof, the contactless power feeding apparatus 1 can perform a constant voltage output operation.

Therefore, by setting the drive frequency to a frequency included in a predetermined frequency range including the resonance frequency of the resonant circuit 20, the contactless power feeding apparatus 1 can perform a constant voltage output operation, and the power transmission efficiency can also be improved. Note that the predetermined frequency range may be set such that the change in output voltage due to the change in resistance of the load circuit 4 is included in an allowable range of the output voltage in a system on which the contactless power feeding apparatus 1 is mounted, for example.

Moreover, as long as the degree of coupling k between the transmission coil 14 and the receiver coil 21 satisfies a condition $1 \gg k^2$ (e.g., when the degree of coupling k is 0.2 or less), the drive frequency for the contactless power feeding apparatus 1 to perform a constant voltage output operation does not change, even if there is a slight change in the positional relationship between the transmission coil 14 and the receiver coil 21. Therefore, the control circuit 19 of the power transmitting apparatus 2 need not change the cycle time at which on/off of the switching elements 13-1 and 13-2 of the inverter 13 is switched, even if there is a slight change in the positional relationship between the transmission coil 14 and the receiver coil 21.

Furthermore, in order for the inverter 13 to perform soft switching, there is a need to set the delay amount of the phase of a current flowing in the transmission coil 14 relative to the phase of AC power supplied to the transmission coil 14 to an appropriate value. Accordingly, it may be preferable that the resonance frequency (closed loop resonance frequency) Fp of a closed loop constituted by the transmission coil 14, the first capacitor 15, and the second capacitor 16 in the power transmitting apparatus 2 is higher than a drive frequency Fsw. Note that the closed loop resonance frequency Fp is represented by the following equation.

[Equation 6]

$$Fp = \frac{1}{2\pi \sqrt{L_p \left( \frac{C_1 \cdot C_p}{C_1 + C_p} \right)}} \quad (6)$$

Therefore, as a result of the inductance of the transmission coil 14 and the electrostatic capacitances of the first capacitor 15 and the second capacitor 16 being set to satisfy Equation (6), the delay of phase of a current flowing in the transmission coil 14 relative to the phase of the voltage of AC power supplied to the transmission coil 14 is suppressed from being excessively large. As a result, the switching loss in each switching element of the inverter 13 is reduced.

Figure 5:
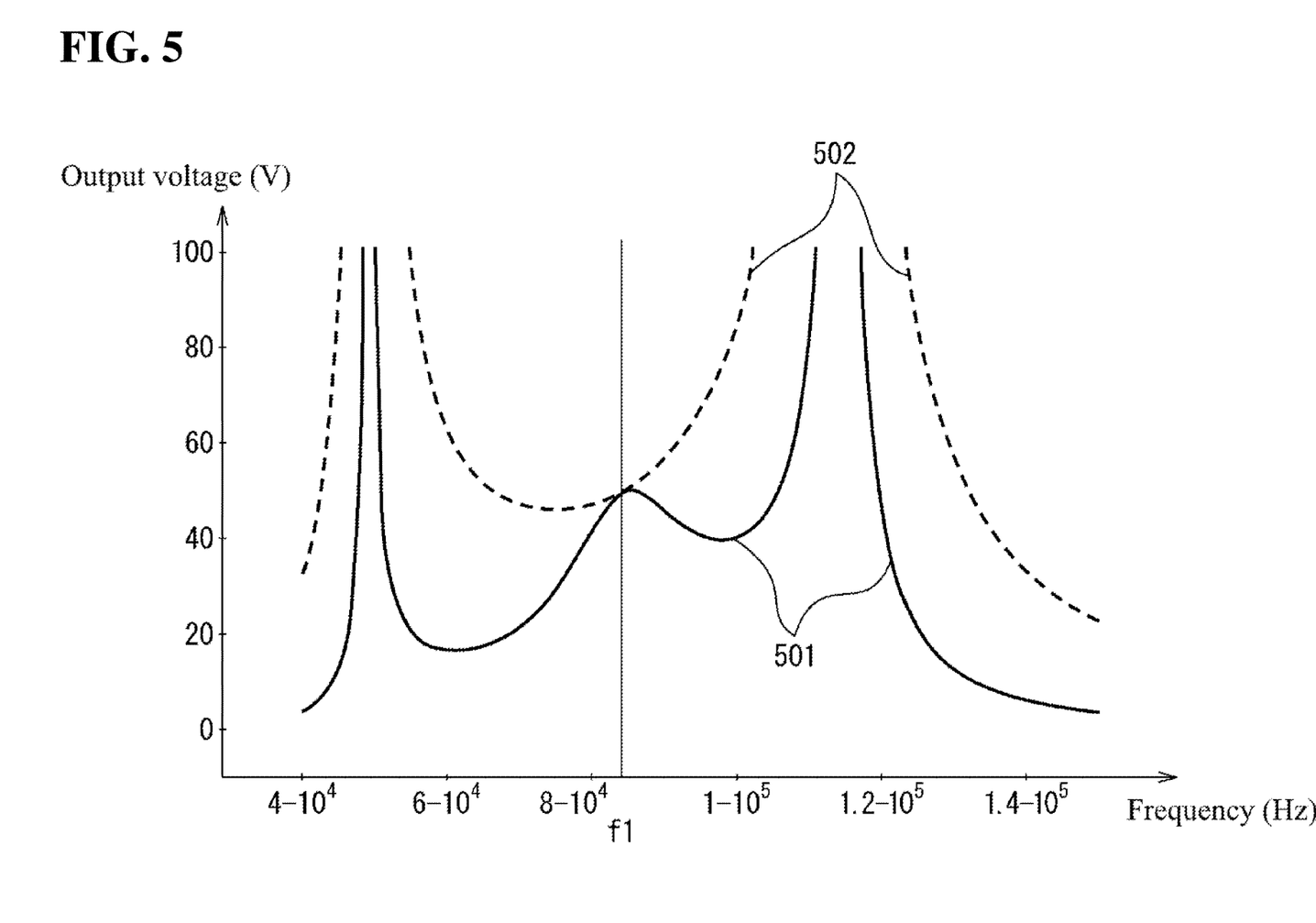
FIG. 5 is a diagram illustrating an example of a simulation result of frequency characteristics of an output voltage of a contactless power feeding apparatus according to one or more embodiments.

FIG. 5 is a diagram illustrating an example of a simulation result of frequency characteristics of the output voltage of the contactless power feeding apparatus 1. In FIG. 5, the horizontal axis shows the frequency and the vertical axis shows the output voltage. Also, in this simulation, the electrostatic capacitance $C_1$ of the first capacitor 15 was set to 40.1 nF, and the electrostatic capacitance $C_p$ of the second capacitor 16 was set to 45.6 nF. Also, the inductance $L_{in}$ of the first coil 17 was set to 70.0 μH. Moreover, the inductances of the transmission coil 14 and the receiver coil 21 were each set to 160 μH. Furthermore, the electrostatic capacitance $C_s$ of the resonance capacitor 22 was set to 22.4 nF. Also, the winding wire resistance value on the power transmitting side and the winding wire resistance value on the power receiving side were each set to 0.13Ω. Moreover, the voltage $V_{in}$ of AC power output from the inverter 13 was set to 440 V. A graph 501 shows frequency characteristics of the output voltage when the degree of coupling k between the transmission coil 14 and the receiver coil 21 was set to 0.11, and the AC-equivalent resistance value of the load circuit 4 was set to 20Ω. Also, a graph 502 shows frequency characteristics of the output voltage when the degree of coupling k was set to 0.11, and the AC-equivalent resistance value of the load circuit 4 was set to 2 kΩ. As shown in the graphs 501 and 502, it is understood that, at the resonance frequency f1 (=84.1 kHz) of the resonant circuit 20, the output voltage is kept constant, even if the AC-equivalent resistance value of the load circuit 4 changes. Furthermore, it is understood that, at the resonance frequency f1, the output voltage is at the maximum value in the frequency characteristics, and the change in output voltage relative to the change in frequency is smoother than at other frequencies at which the output voltage is at the maximum value. Therefore, it is understood that, by setting the drive frequency fsw to a frequency in a predetermined range including the resonance frequency f1 of the resonant circuit 20, the contactless power feeding apparatus 1 can perform a constant voltage output operation, and the power transmission efficiency can also be improved.

As described above, in the contactless power feeding apparatus, the power receiving apparatus includes a power transmitting circuit for transmitting, to the power transmitting apparatus, AC power having a voltage according to power received from the power transmitting apparatus and having a frequency different from the frequency of AC power supplied to the transmission coil, and the power transmitting apparatus includes the power receiving circuit for receiving the transmitted AC power. Therefore, in this contactless power feeding apparatus, the power receiving apparatus can notify the power transmitting apparatus of information regarding the output voltage of the power receiving apparatus without using communicators. Therefore, in this contactless power feeding apparatus, the configuration of this contactless power feeding apparatus can be simplified.

Note that the power transmitting circuit 27 of the power receiving apparatus 3 may include a circuit with a configuration different from the circuit configuration described above, serving as a circuit for supplying AC power to the counter-transmission coil 27-5. For example, the power transmitting circuit 27 may include a DC-DC converter for stepping up the voltage of DC power output from the first rectifier circuit 23 or the second rectifier circuit 26, and a full-bridge inverter for converting DC power whose voltage has been stepped up by the DC-DC converter to AC power having a frequency different from the drive frequency and supplying the resultant AC power to the counter-transmission coil 27-5.

Also, the power transmitting circuit 27 of the power receiving apparatus 3 and the power receiving circuit 18 of the power transmitting apparatus 2 may be configured according to another contactless power feeding method. For example, the power transmitting circuit 27 and the power receiving circuit 18 may be configured, on both of a power transmitting side and a power receiving side, according to SS topology in which a coil and a resonance capacitor resonate in series. Alternatively, the power transmitting circuit 27 and the power receiving circuit 18 may also be configured according to NS topology in which resonance is not utilized on a power transmitting side, and a coil and a resonance capacitor resonate in series for transmitted AC power on a power receiving side. Also, the power transmitting circuit 27 and the power receiving circuit 18 may also be configured according to NP topology in which resonance is not utilized on a power transmitting side, and a coil and a resonance capacitor resonate in parallel for transmitted AC power on a power receiving side.

According to another modification, the subcoil 25 may also be used as a counter-transmission coil. In this case, the power transmitting circuit 27 may be configured such that AC power generated by the power transmitting circuit 27 is supplied to the subcoil 25.

According to yet another modification, when the positional relationship between the transmission coil 14 and the receiver coil 21 is ensured by the structures of a device on which the power transmitting apparatus 2 is to be mounted and a device on which the power receiving apparatus 3 is to be mounted such that an excessive voltage will not occur in the power receiving apparatus 3, the subcoil 25 and the second rectifier circuit 26 may be omitted. With this, the circuit configuration of the power receiving apparatus 3 is simplified.

According to yet another modification, when the voltage of returning power indicated by voltage information is a predetermined lower limit threshold value or less, it is envisioned that the power receiving apparatus 3 is not present at a position from which power can be received from the power transmitting apparatus 2. Therefore, the control circuit 19 of the power transmitting apparatus 2 may control the power supply circuit 10 in a burst mode until the voltage of returning power exceeds the predetermined lower limit threshold value. That is, while the burst mode is applied, the control circuit 19 controls the duty ratio of the switching element of the power factor improvement circuit 12 such that the power supply circuit 10 is caused to supply AC power having a predetermined voltage to the transmission coil 14 for a predetermined period at fixed intervals. On the other hand, the control circuit 19 sets the duty ratio of the switching element of the power factor improvement circuit 12 to zero such that AC power is not supplied from the power supply circuit 10 to the transmission coil 14, in periods other than the predetermined period. Then, when the voltage of returning power exceeds the predetermined lower limit threshold value, the control circuit 19 may control the power supply circuit 10 such that the output voltage of the power receiving apparatus 3 is in an allowable range, as in the embodiment described above. Note that the fixed interval is set to one to ten seconds, for example, and the predetermined period is set to a period shorter than the fixed interval, 100 ms, for example. As a result of applying such a burst mode, the control circuit 19 can reduce power consumption when the power receiving apparatus 3 cannot receive power from the power transmitting apparatus 2.

Also, the configuration of the power transmitting apparatus 2 and the configuration of the power receiving apparatus 3 are not limited to those of the embodiment described above. For example, the power transmitting apparatus 2 and the power receiving apparatus 3 may be configured according to SP topology. In this case, the first coil 17 and the second capacitor 16 may be omitted from the power transmitting apparatus 2. Also, in the resonant circuit 20 of the power receiving apparatus 3, the receiver coil 21 and the resonance capacitor 22 are connected in parallel. Alternatively, the power transmitting apparatus 2 and the power receiving apparatus 3 may be configured according to another contactless power feeding method such as SS topology, NS topology, or NP topology.

As described above, a person skilled in the art can perform various modifications according to modes to be implemented, within a scope.

The invention claimed is:

1. A contactless power feeding apparatus comprising:
    a power transmitting apparatus; and
    a power receiving apparatus to which power is contactlessly transmitted from the power transmitting apparatus, wherein
    the power transmitting apparatus comprises:
        a transmission coil for supplying power to the power receiving apparatus;
        a power supply circuit configured to supply AC power having a predetermined drive frequency to the transmission coil;
        a power receiving circuit configured to receive returning power transmitted from the power receiving apparatus; and
        a control circuit configured to control the power supply circuit to supply AC power having the drive frequency to the transmission coil, and perform control, according to a voltage of the returning power, such that an output voltage of the power receiving apparatus is in a predetermined allowable range, and
    the power receiving apparatus comprises:
        a resonant circuit comprising a receiver coil for receiving power via the transmission coil of the power transmitting apparatus, and a resonance capacitor that resonates together with the receiver coil;
        a rectifier circuit configured to rectify power received via the resonant circuit; and
        a power transmitting circuit configured to transmit the returning power according to a voltage of power output from the rectifier circuit to the power transmitting apparatus, and wherein
    the power receiving circuit comprises a counter-receiver coil for receiving the returning power, and the counter-receiver coil and the transmission coil are arranged such that a winding axis of the counter-receiver coil matches a winding axis of the transmission coil; and
    the power transmitting circuit comprises a counter-transmission coil for transmitting the returning power, and the counter-transmission coil and the receiver coil are arranged such that a winding axis of the counter-transmission coil matches a winding axis of the receiver coil.

2. The contactless power feeding apparatus according to claim 1, wherein the power transmitting circuit changes the frequency of the returning power from the drive frequency.

3. The contactless power feeding apparatus according to claim 2, wherein the power receiving circuit comprises a filter circuit for removing a frequency component corresponding to the drive frequency from the received returning power.

* * * * *